United States Patent
Amenomori et al.

(10) Patent No.: US 11,713,260 B2
(45) Date of Patent: Aug. 1, 2023

(54) ELECTROLYZED WATER GENERATING DEVICE AND ELECTROLYZED WATER GENERATING METHOD

(71) Applicant: NIHON TRIM CO., LTD., Osaka (JP)

(72) Inventors: Daiji Amenomori, Nankoku (JP); Yoshinobu Koizumi, Nankoku (JP); Yuhei Yamauchi, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 98 days.

(21) Appl. No.: 17/270,437

(22) PCT Filed: Aug. 9, 2019

(86) PCT No.: PCT/JP2019/031685
§ 371 (c)(1),
(2) Date: Feb. 23, 2021

(87) PCT Pub. No.: WO2020/045063
PCT Pub. Date: Mar. 5, 2020

(65) Prior Publication Data
US 2021/0254226 A1 Aug. 19, 2021

(30) Foreign Application Priority Data
Aug. 31, 2018 (JP) .................................. 2018-162755

(51) Int. Cl.
*C02F 1/461* (2023.01)
*C25B 15/023* (2021.01)
(Continued)

(52) U.S. Cl.
CPC ........ *C02F 1/4618* (2013.01); *C02F 1/46104* (2013.01); *C25B 1/04* (2013.01);
(Continued)

(58) Field of Classification Search
CPC ...................................................... C02F 1/461
(Continued)

(56) References Cited

U.S. PATENT DOCUMENTS 3,342,712 A * 9/1967 O'Keefe, Sr. ....... C02F 1/46176
204/196.15
5,445,722 A * 8/1995 Yamaguti .............. C02F 1/4618
204/263

(Continued)

FOREIGN PATENT DOCUMENTS

CN 102441674 A 5/2012
EP 636581 A1 * 2/1995 ............ C02F 1/4618
(Continued)

OTHER PUBLICATIONS

Asada et al., Antitumor effects of nano-bubble hydrogen-dissolved water are enhanced by coexistent platinum colloid and the combined hyperthermia with apoptosis-like cell death, Oncology Reports, vol. 24, No. 6, Dec. 2010, pp. 1463-1470 (Year: 2010).*

*Primary Examiner* — Harry D Wilkins, III
(74) *Attorney, Agent, or Firm* — Muncy, Geissler, Olds & Lowe, P.C.

(57) ABSTRACT

An electrolyzed water generating device 1 has an electrolysis chamber 40, a first feeding body 41 and a second feeding body 41 to which a DC voltage is applied, a diaphragm 43 disposed between the first feeding body 41 and the second feeding body 42 to divide the electrolysis chamber 40 into a first-polar chamber 40a and a second-polar chamber 40b, a control unit 5 for switching a polarity of the first feeding body 41 to an anode or a cathode and a polarity of the second feeding body 42 to a cathode or an anode, a flow rate sensor 22 detecting an amount of flowing water into the electrolysis chamber 40 on the cathode side per unit time, and a current detecting means 44 detecting a DC current supplied to the first feeding body 41 and the second feeding body 42. The (Continued)

surfaces of the first feeding body 41 and the second feeding body 42 are formed of a hydrogen storage metal. The control unit 5 calculates a concentration of hydrogen storage metal colloid based on the DC current and an integrated value of the amount of flowing water after switching the polarities.

6 Claims, 5 Drawing Sheets

(51) Int. Cl.
*C25B 9/19* (2021.01)
*C25B 9/65* (2021.01)
*C25B 1/04* (2021.01)
*C25B 13/00* (2006.01)

(52) U.S. Cl.
CPC .................. *C25B 9/19* (2021.01); *C25B 9/65* (2021.01); *C25B 13/00* (2013.01); *C25B 15/023* (2021.01); *C02F 2201/4612* (2013.01); *C02F 2201/4613* (2013.01); *C02F 2201/4614* (2013.01); *C02F 2201/46115* (2013.01); *C02F 2201/46145* (2013.01)

(58) Field of Classification Search
USPC .......................................................... 204/260
See application file for complete search history.

(56) References Cited

U.S. PATENT DOCUMENTS

| | | | |
|---|---|---|---|
| 6,174,419 B1 * | 1/2001 | Akiyama | ................ C25B 15/00 204/229.4 |
| 7,303,660 B2 * | 12/2007 | Buckley | .................. A61P 43/00 204/260 |
| 2004/0154993 A1 * | 8/2004 | Yanagihara | ............. A61P 39/06 205/742 |

FOREIGN PATENT DOCUMENTS

| | | | | |
|---|---|---|---|---|
| EP | 3248947 A1 | | 11/2017 | |
| JP | H11-128938 A | | 5/1999 | |
| JP | 2009050774 A | | 3/2009 | |
| JP | 2015-087221 | * | 5/2015 | ............... C02F 1/46 |
| JP | 2015087221 A | | 5/2015 | |
| WO | WO 2007/090507 A1 | * | 8/2007 | ............. C02F 1/461 |

* cited by examiner

ELECTROLYZED WATER GENERATING DEVICE AND ELECTROLYZED WATER GENERATING METHOD

TECHNICAL FIELD

The present invention relates to an electrolyzed water generating device which generates electrolyzed water containing a hydrogen storage metal.

BACKGROUND ART

Conventionally, an electrolyzed water generating device which generates electrolyzed water by electrolyzing water, has been in widespread use. For example, in Patent Document 1, it is configured to calculate and display the dissolved hydrogen concentration of the electrolyzed water, and the usability is improved.

On the other hand, various studies and developments have been made on electrolyzed water containing a colloidal hydrogen storage metal colloid. For example, in Patent Document 2, there has been proposed a water processing apparatus provided with an electrode pair to which an AC voltage is applied and an electrode pair to which a DC voltage is applied.

PRIOR ART DOCUMENTS

Patent Documents

Patent Document 1: Japanese Patent Application Publication No. 2015-087221
Patent Document 2: Japanese Patent Application Publication No. 2009-050774

However, a technique for knowing the concentration of hydrogen storage metal colloid in electrolyzed water has not been established, and further improvement is desired.

SUMMARY OF THE INVENTION

Problems to be Solved by the Invention

The present invention has been devised in view of the above circumstances, and an object of the present invention is to provide an electrolyzed water generating device in which it is possible to know the concentration of hydrogen storage metal colloid in the electrolyzed water.

Means of Solving the Problems

An electrolyzed water generating device according to the present invention has
an electrolysis chamber for electrolyzing water so as to generate electrolyzed water,
a first feeding body and a second feeding body which are disposed in the electrolysis chamber and to which a DC voltage is applied,
a diaphragm disposed between the first feeding body and the second feeding body to divide the electrolysis chamber into a first-polar chamber on the first feeding body side and a second-polar chamber on the second feeding body side,
a control unit for switching a polarity of the first feeding body to an anode or a cathode, and a polarity of the second feeding body to a cathode or an anode,
a flow rate sensor detecting an amount of flowing water into the electrolysis chamber on the cathode side per unit time, and
a current detecting means detecting a DC current supplied to the first feeding body and the second feeding body, wherein
the surfaces of the first feeding body and the second feeding body are formed of a hydrogen storage metal, and
the control unit calculates a concentration of hydrogen storage metal colloid contained in the electrolyzed water generated in the electrolysis chamber on the cathode side based on the above-said DC current and an integrated value of the above-said amount of flowing water after switching the polarities.

In the electrolyzed water generating device, it is desirable that the control unit calculates the above-said concentration further based on the above-said DC current before switching the polarities.

In the electrolyzed water generating device, it is desirable that the electrolyzed water generating device is further provided with
a storage unit which stores data showing a correlation between the concentration, and the integrated value of the amount of flowing water and the DC current after switching the polarities, which are measured in advance, and
the control unit calculates the above-said concentration based on the data stored in the storage unit.

In the electrolyzed water generating device, it is desirable that the electrolyzed water generating device is further provided with a display unit for displaying the concentration calculated by the control unit.

An electrolyzed water generating method according to the present invention is an electrolyzed water generating method which generates electrolyzed water by electrolyzing water, using
an electrolysis chamber for electrolyzing the water to generate the electrolyzed water, and
a first feeding body and a second feeding body whose surfaces are formed of a hydrogen storage metal and which are disposed in the electrolysis chamber,
and which comprises
a step of switching a polarity of the first feeding body to an anode or a cathode, and a polarity of the second feeding body to a cathode or an anode,
a step of detecting an amount of flowing water into the electrolysis chamber on the cathode side per unit time,
a step of detecting a DC current supplied to the first feeding body and the second feeding body, and
a calculation step of calculating a concentration of hydrogen storage metal colloid contained in the electrolyzed water generated in the electrolysis chamber on the cathode side based on the DC current and an integrated value of the amount of flowing water after switching the polarities.

In the electrolyzed water generating method, it is desirable that the calculation step calculates the concentration based on the DC current before switching the polarities.

Effect of the Invention

In the electrolyzed water generating device according to the present invention, the hydrogen storage metal is ionized in the electrolysis chamber on the anode side.
After that, when the polarities of the first feeding body and the second feeding body are switched, then
in the electrolysis chamber on the cathode side,
colloidal hydrogen storage metal separates out, and electrolyzed water containing a large amount of hydrogen storage metal colloid is generated.
The concentration of the hydrogen storage metal colloid contained in the electrolyzed water, depends on the DC current supplied to the first feeding body and the second feeding body, and the integrated value of the amount of flowing water into the electrolysis chamber on the cathode side after the polarities were switched.

Therefore, the control unit can accurately calculate the concentration of the hydrogen storage metal colloid contained in the electrolyzed water based on the integrated value of the amount of flowing water and the DC current after switching the polarities, In the electrolyzed water generating method according to the present invention, the hydrogen storage metal is ionized in the electrolysis chamber on the anode side.

After that, when the polarities of the first feeding body and the second feeding body are switched, then
in the electrolysis chamber on the cathode side,
colloidal hydrogen storage metal separates out, and
electrolyzed water containing a large amount of hydrogen storage metal colloid is generated.

The concentration of the hydrogen storage metal colloid contained in the electrolyzed water, depends on the DC current supplied to the first feeding body and the second feeding body, and the integrated value of the amount of flowing water into the electrolysis chamber on the cathode side after the polarities were switched.

In the calculation step, therefore, it is possible to accurately calculate the concentration of the hydrogen storage metal colloid contained in the electrolyzed water based on the integrated value of the amount of flowing water and the DC current after switching the polarities,

MODE FOR CARRYING OUT THE INVENTION

Hereinafter, an embodiment of the present invention will be described with reference to the drawings.

Figure 1:
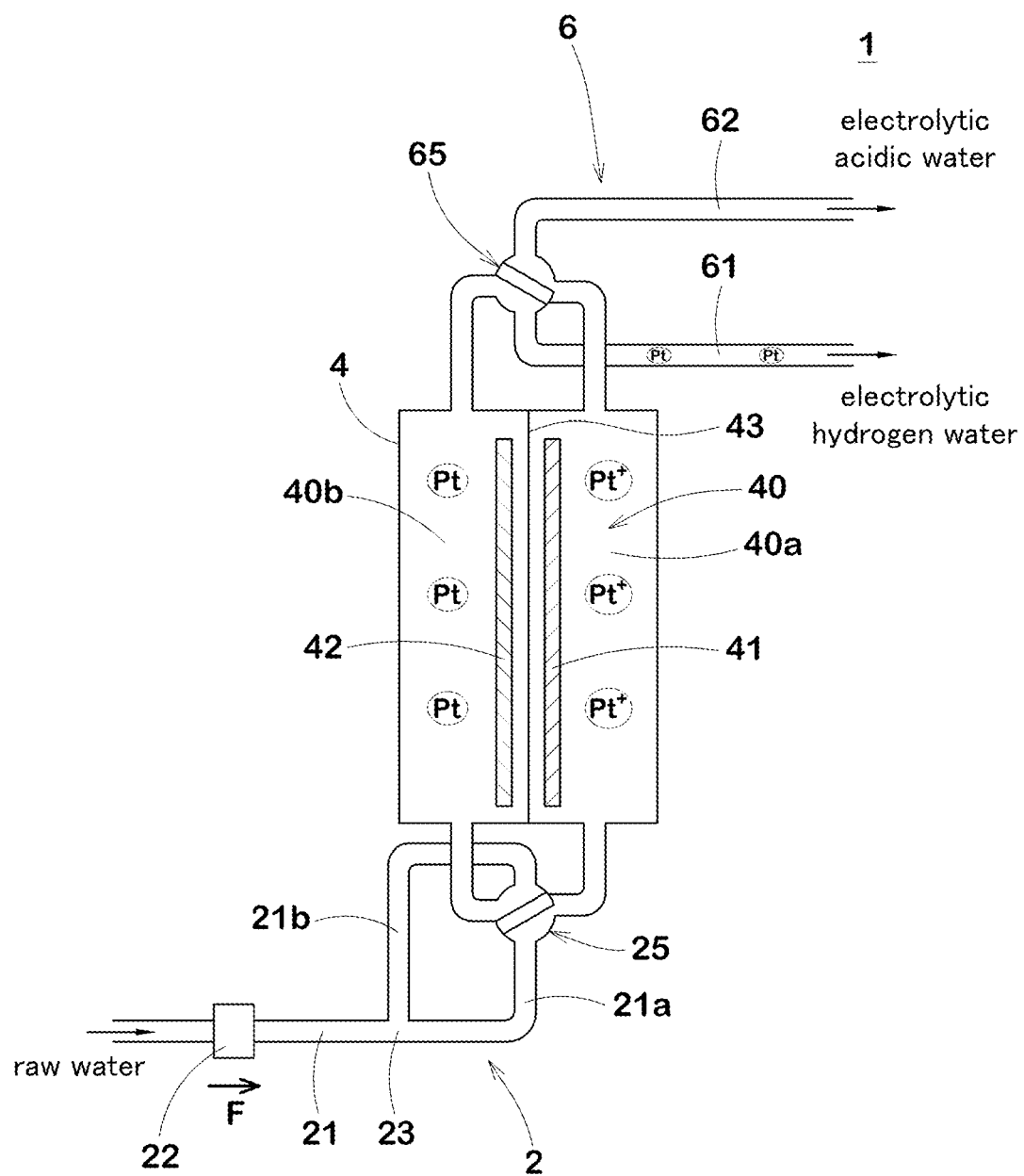
FIG. 1 a diagram showing a flow path configuration of an embodiment of the electrolyzed water generating device of the present invention.

FIG. 1 shows a schematic configuration of the electrolyzed water generating device 1 of the present embodiment.

Figure 2:
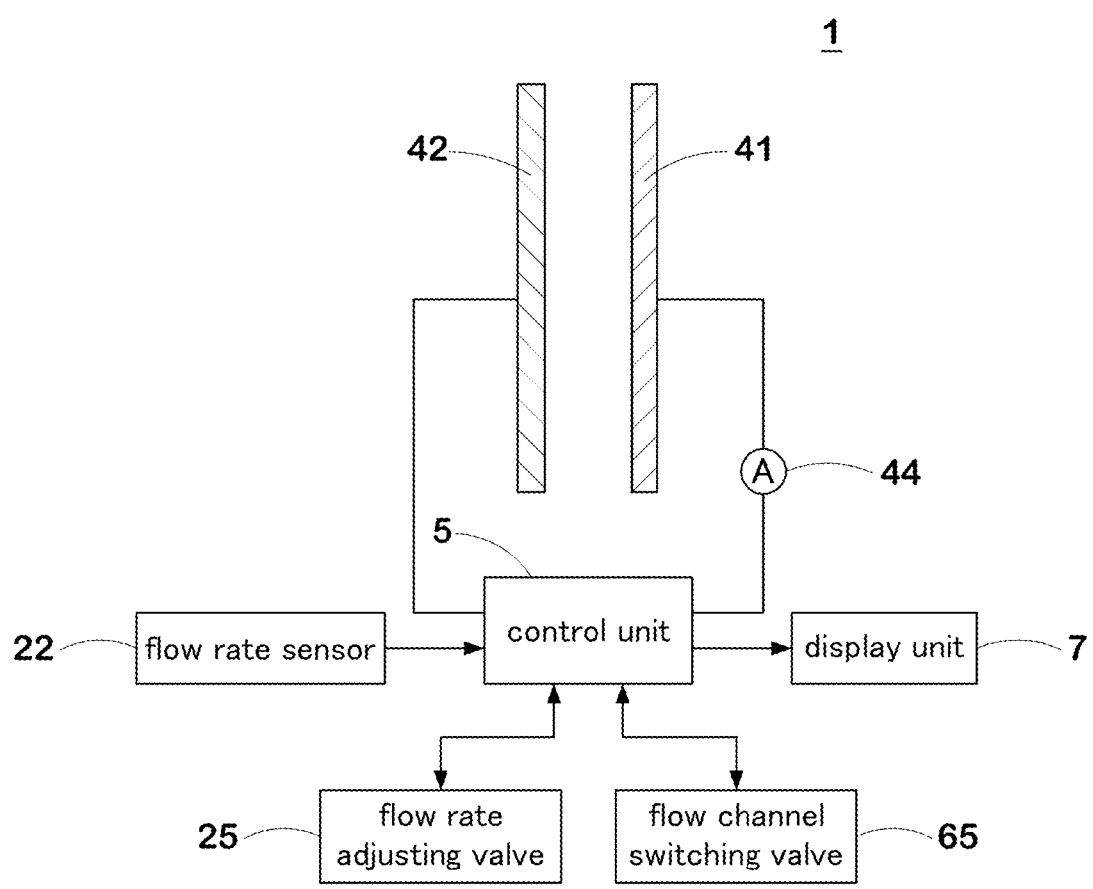
FIG. 2 a block diagram showing an electrical configuration of the electrolyzed water generating device.

FIG. 2 shows the electrical configuration of the electrolyzed water generating device 1.

The electrolyzed water generating device 1 is provided with an electrolysis chamber 40 to which water to be electrolyzed is supplied,
a first feeding body 41 and a second feeding body 42 which are different from each other in polarity,
a diaphragm 43 dividing the electrolysis chamber 40, and
a control unit 5 which controls each part of the electrolyzed water generating device 1.

The electrolysis chamber 40 is formed inside the electrolysis tank 4. Raw water before electrolyzed is supplied to the electrolysis chamber 40. As the raw water, tap water is generally used, but other water such as well water, groundwater and the like can be used. A water purification cartridge for purifying the water supplied to the electrolysis chamber 40 may be provided on the upstream of the electrolysis chamber 40.

The first feeding body 41 and the second feeding body 42 are arranged so as to face each other in the electrolysis chamber 40.

The surfaces of the first feeding body 41 and the second feeding body 42 are formed of a hydrogen storage metal.

The hydrogen storage metal includes, for example, platinum, palladium, vanadium, magnesium and zirconium, and alloys containing these as a component are also included.

In the present embodiment, a plating layer of platinum is formed on the surfaces of the first feeding body 41 and the second feeding body 42.

The diaphragm 43 is disposed between the first feeding body 41 and the second feeding body 42.

The diaphragm 43 divides the electrolysis chamber 40 into a first-polar chamber 40a on the first feeding body 41 side and a second-polar chamber 40b on the second feeding body 42 side. When a DC voltage is applied between the first feeding body 41 and the second feeding body 42 in a state such that the electrolysis chamber 40 is filled with water, then the water is electrolyzed in the electrolysis chamber 40, and electrolyzed water can be obtained.

For the diaphragm 43, for example, a polytetrafluoroethylene (PTFE) hydrophilic membrane is used. For the diaphragm 43, for example, a solid polymer material made of a fluororesin having a sulfonic acid group may be used.

FIG. 1 shows the electrolyzed water generating device 1 during the electrolyzing operation in the first polarity state. In the "first polarity state", the first feeding body 41 is positively charged, and the first-polar chamber 40a functions as an anode chamber. At the same time, the second feeding body 42 is negatively charged, and the second-polar chamber 40b functions as a cathode chamber.

As a result, in the second-polar chamber 40b, there is generated reducing electrolytic hydrogen water in which the generated hydrogen gas is dissolved, and
in the first-polar chamber 40a, there is generated electrolytic acidic water in which the generated oxygen gas is dissolved.

As shown in FIG. 2, the first feeding body 41 and the second feeding body 42 and the control unit 5 are connected through a current supply line.

The current supply line is provided, between the first feeding body 41 and the control unit 5, with a current detecting means 44. It is also possible that the current supply line is provided, between the second feeding body 42 and the control unit 5, with the current detecting means 44.

The current detecting means 44 detects the DC current (electrolytic current) supplied to the first feeding body 41 and the second feeding body 42, and outputs to the control unit 5 an electric signal corresponding to the value of the DC current.

The control unit 5 has, for example, a CPU (central Processing Unit) which executes various arithmetic processing, information processing and the like, and a memory which stores various information and programs for controlling operations of the CPU. By the CPU, memory and programs, various functions of the control unit 5 are realized.

For example, based on the electric signal output from the current detecting means 44, the control unit 5 controls the DC voltage (electrolytic voltage) applied between the first feeding body 41 and the second feeding body 42 so that the electrolytic current becomes a desired value.

The polarities of the first feeding body 41 and the second feeding body 42 are controlled by the control unit 5. That is, the control unit 5 functions as a polarity switching means for switching the polarities of the first feeding body 41 and the second feeding body 42.

More specifically, the control unit 5 controls such that the first feeding body 41 and the second feeding body 42 become the first polarity state or the second polarity state.

Figure 3:
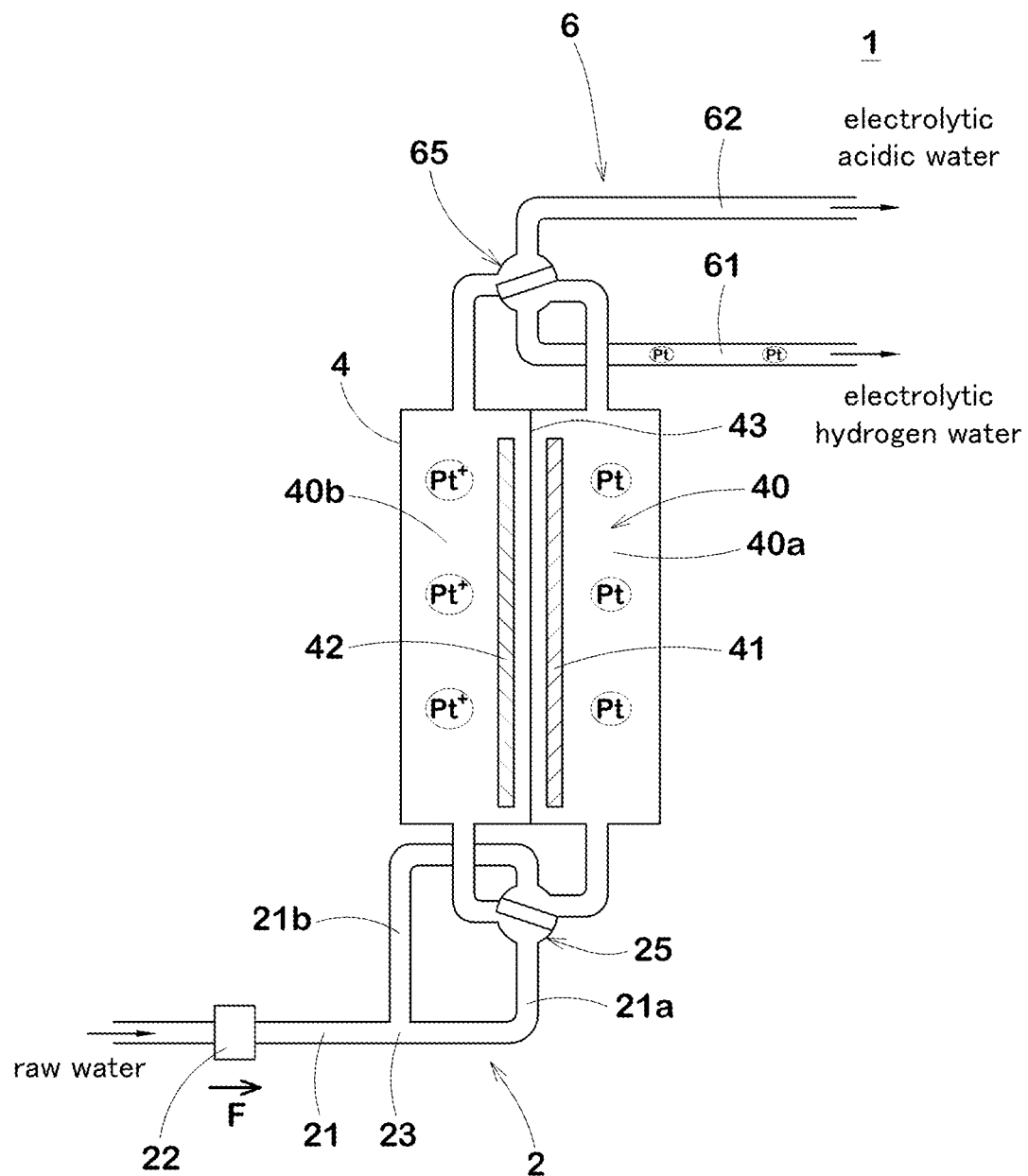
FIG. 3 a diagram showing the electrolyzed water generating device during electrolyzing under a second polarity state.

FIG. 3 shows the electrolyzed water generating device 1 during the electrolyzing operation in the second polarity state. In the "second polarity state", the first feeding body 41 is negatively charged, and the first-polar chamber 40*a* functions as a cathode chamber. At the same time, the second feeding body 42 is positively charged, and the second-polar chamber 40*b* functions as an anode chamber.

As a result, in the first-polar chamber 40*a*, there is generated reducing electrolytic hydrogen water in which the generated hydrogen gas is dissolved, and in the second-polar chamber 40*b*, there is generated electrolytic acidic water in which the generated oxygen gas is dissolved.

Hereinafter, unless otherwise noted, the case where the first feeding body 41 functions as an anode feeding body and the second feeding body 42 functions as a cathode feeding body, will be described. However, the same applies when the polarities of the first feeding body 41 and the second feeding body 42 are switched.

As shown in FIG. 1, the electrolyzed water generating device 1 is further provided with a water inlet section 2 provided on the upstream side of the electrolysis tank 4, and a water outlet section 6 provided on the downstream side of the electrolysis tank 4.

The water inlet section 2 has a water supply channel 21, a flow rate sensor 22, a branch portion 23, a flow rate adjusting valve 25 and the like.

The water supply channel 21 supplies water to be electrolyzed to the electrolysis chamber 40.

The flow rate sensor 22 is provided in the water supply channel 21. The flow rate sensor 22 periodically detects the flow rate F per unit time of the water supplied to the electrolysis chamber 40 (hereinafter, may be simply referred to as the "flow rate"), and outputs a signal corresponding to the value of the flow rate to the control unit 5.

The branch portion 23 branches the water supply channel 21 into two directions of the water supply channels 21*a* and 21*b*. In FIG. 1, the water supply channel 21*a* is a water supply channel for supplying the water to the first-polar chamber 40*a*, and the water supply channel 21*b* is a water supply channel for supplying the water to the second-polar chamber 40*b*.

The flow rate adjusting valve 25 connects the water supply channel 21*a*, 21*b* to the first-polar chamber 40*a* or the second-polar chamber 40*b*.

The flow rate of the water supplied to the first-polar chamber 40*a* and the second-polar chamber 40*b* is adjusted by the flow rate adjusting valve 25 under the control of the control unit 5. In the present embodiment, since the flow rate sensor 22 is provided on the upstream side of the branch portion 23, it detects the sum of a flow rate of the water supplied to the first-polar chamber 40*a* and a flow rate of the water supplied to the second-polar chamber 40*b*, that is, the flow rate F of the water supplied to the electrolysis chamber 40.

The ratio between the flow rate of the water supplied to the first-polar chamber 40*a* and the flow rate of the water supplied to the second-polar chamber 40*b* is adjusted by the flow rate adjusting valve 25.

The control unit 5 which controls the flow rate adjusting valve 25, can acquire the flow rate of the water supplied to the first-polar chamber 40*a* and the second-polar chamber 40*b* based on the flow rate F and the above ratio.

The water outlet section 6 has a first water discharge channel 61, a second water discharge channel 62, and a flow channel switching valve 65.

In FIG. 1, the first water discharge channel 61 functions as a cathode water channel for taking out the electrolyzed water (that is, electrolytic hydrogen water) generated in one polar chamber on the cathode side of the first-polar chamber 40*a* and the second-polar chamber 40*b*.

On the other hand, the second water discharge channel 62 functions as an anode water channel for taking out the electrolyzed water generated in the other polar chamber on the anode side of the first-polar chamber 40*a* and the second-polar chamber 40*b* (hereinafter referred to as the anode chamber).

The flow channel switching valve 65 is provided on the downstream side of the electrolysis tank 4.

The flow channel switching valve 65 functions as a flow channel switching means for switching the connections of the first-polar chamber 40*a* and the second-polar chamber 40*b* to the first water discharge channel 61 and the second water discharge channel 62.

In the present embodiment, since the control unit 5 synchronizes the switching of the polarities of the first feeding body 41 and the second feeding body 42 with the switching of the water channels by the flow channel switching valve 65, the electrolyzed water selected by the user (for example, electrolytic hydrogen water in FIG. 1) can be discharged from the first water discharge channel 61.

It is desirable that the control unit 5 operates the flow rate adjusting valve 25 and the flow channel switching valve 65 along with the switching of the polarities of the first feeding body 41 and the second feeding body 42. Thereby, before and after the switching of the polarities, the amount of water supplied to the polar chamber connected to the second water discharge channel 62 is suppressed, while sufficiently securing the amount of water supplied to the polar chamber connected to the first water discharge channel 61, and it becomes possible to make effective use of the water.

It is desirable that the flow rate adjusting valve 25 and the flow channel switching valve 65 are integrally formed as described in Japanese Patent No. 5809208, for example, and driven together by a single motor. That is, the flow rate adjusting valve 25 and the flow channel switching valve 65 are composed of a cylindrical outer cylinder, a cylindrical inner cylinder and the like. Flow paths which form the flow rate adjusting valve 25 and the flow channel switching valve 65 are formed inside and outside the inner cylinder, and each of the flow paths is configured to intersect as appropriate corresponding to the operating states of the flow rate adjusting valve 25 and the flow channel switching valve 65. Such a valve device called a "double auto change cross line valve", contributes to simplification of the structure and control of the electrolyzed water generating device 1, and enhances the commercial value of the electrolyzed water generating device 1.

In the present embodiment, the surfaces of the first feeding body 41 and the second feeding body 42 are formed of the hydrogen storage metal, therefore, in the first polarity state shown in FIG. 1, the hydrogen storage metal is ionized in the first-polar chamber 40a as the anode feeding body.

Even after the completion of the electrolysis, some of the hydrogen storage metal ions (platinum ions in this embodiment) generated at this time, remain in the first-polar chamber 40a and adhere to the surface of the first feeding body 41.

After that, when the control unit 5 switches the polarities of the first feeding body 41 and the second feeding body 42 to change into the second polarity state shown in FIG. 3, then the first feeding body 41 disposed in the first-polar chamber 40a in which the hydrogen storage metal ions are present, serves as a cathode to attract the hydrogen storage metal ions and supplies electrons. Along with this, in the first-polar chamber 40a, colloidal hydrogen storage metal separates out, and there is generated electrolyzed water containing a large amount of minute hydrogen storage metal colloid having diameters of nanometer level (platinum nanocolloid in this embodiment).

On the other hand, in the second polarity state, the hydrogen storage metal is ionized in the second-polar chamber 40b on the side of the second feeding body 42 which is the anode feeding body. After that, when the control unit 5 switches the polarities of the first feeding body 41 and the second feeding body 42 to change into the first polarity state shown in FIG. 1, then the second feeding body 42 becomes a cathode, and in the second-polar chamber 40b, electrolyzed water containing a large amount of hydrogen storage metal colloid is generated.

The control unit 5 calculates the concentration of the hydrogen storage metal colloid contained in the electrolyzed water generated in the electrolysis chamber 40 on the cathode side based on the signals input from the flow rate sensor 22 and the current detecting means 44. As a result, it becomes possible to accurately calculate the concentration of the hydrogen storage metal colloid in the electrolyzed water.

Figure 4:
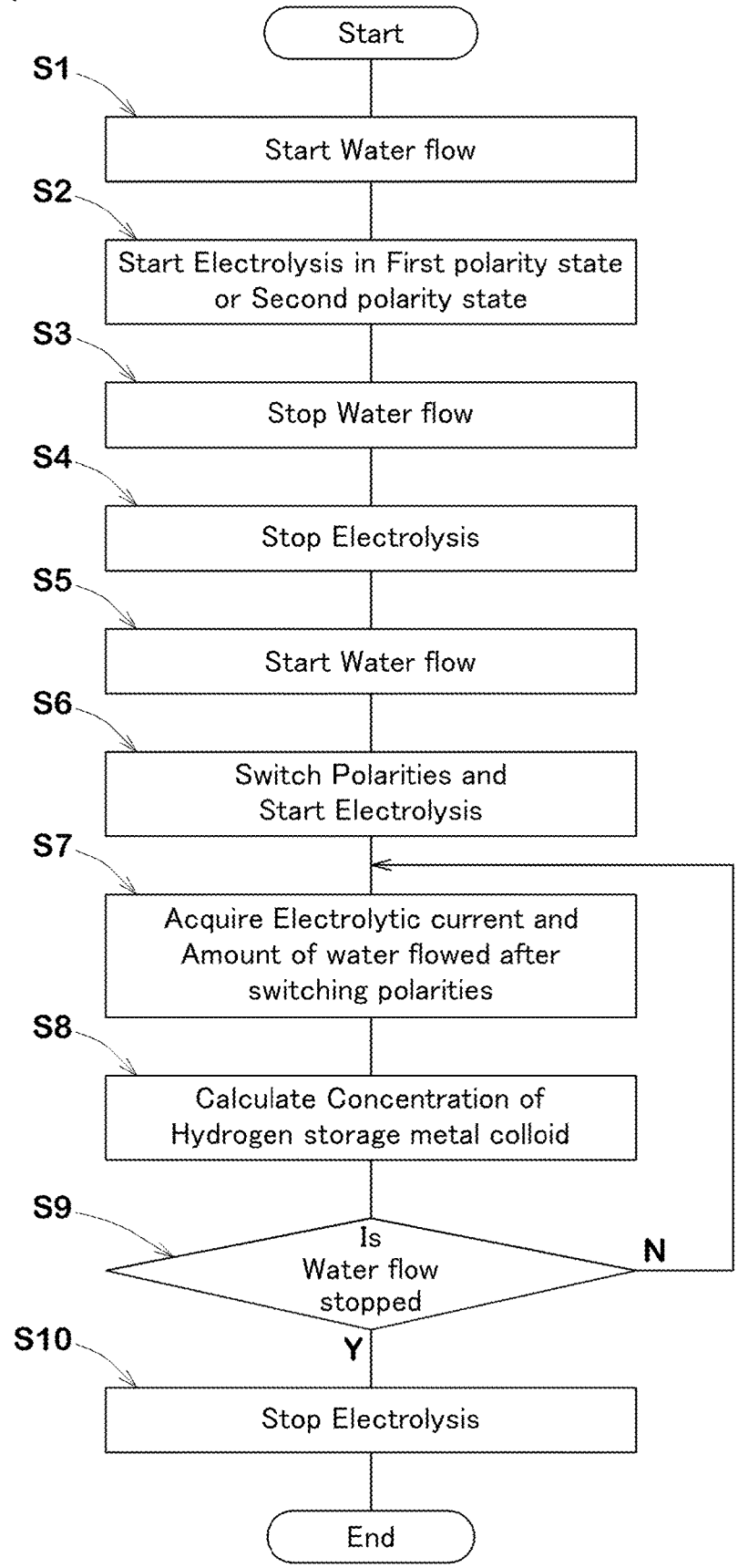
FIG. 4 a flowchart showing the operation of the control unit of the electrolyzed water generating device.

FIG. 4 shows a flow in which the control unit 5 calculates the concentration of the hydrogen storage metal colloid in the electrolyzed water.

As described above, based on the signal input from the flow rate sensor 22, the control unit 5 detects the flowing water into the electrolyzed water generating device 1.

When the flowing of water into the electrolyzed water generating device 1 is started (S1), then the control unit 5 applies an electrolytic voltage to the first feeding body 41 and the second feeding body 42 in the first polarity state or the second polarity state to start the electrolysis (S2).

After that, when the flowing water into the electrolyzed water generating device 1 is stopped (S3), then the control unit 5 stops applying the electrolytic voltage to the first feeding body 41 and the second feeding body 42 to stop the electrolyzes (S4).

Further, when the flow of water into the electrolyzed water generating device 1 is started (S5), then the control unit 5 switches the polarities into the second polarity state or the first polarity state, and applies an electrolytic voltage to the first feeding body 41 and the second feeding body 42 to start the electrolysis (S6).

The switching of the polarities may be executed immediately after the electrolysis in S4 is stopped. In this case, the control unit 5 waits until the start of water flow in S5 in the ready state for applying the electrolytic voltage with the switched polarities.

Based on the signals input from the flow rate sensor 22 and the current detecting means 44, the control unit 5 having let the electrolysis started in the electrolysis tank 4 in S6, acquires the amount of flowing water and the electrolytic current after the polarities have been switched (S7).

Then, the control unit 5 integrates the amount of flowing water after the polarities were switched, and based on the obtained integrated value of the amount of flowing water and the electrolytic current, the control unit calculates the concentration of the hydrogen storage metal colloid contained in the electrolyzed water generated in the electrolysis chamber 40 on the cathode side (S8).

The above processing S7 and processing S8 are repeated until the flow of water to the electrolyzed water generating device 1 is stopped (N in S9).

After that, when the flow of water into the electrolyzed water generating device 1 is stopped (Y in S9), then the control unit 5 stops applying the electrolytic voltage to the first feeding body 41 and the second feeding body 42, that is, stops the electrolysis to stop the processing (S10).

After S10, it may be possible to make a shift to S6 when the flow of water into the electrolyzed water generating device 1 is started.

The concentration of the hydrogen storage metal colloid contained in the electrolyzed water also depends on the amount of hydrogen storage metal ions in the electrolysis chamber. The amount of hydrogen storage metal ions depends on the electrolytic current before switching the polarities, that is, in S2 in FIG. 4. Therefore, the control unit 5 may be configured to calculate the concentration of the hydrogen storage metal colloid in S8, based on the electrolytic current before switching the polarities in addition to the integrated value of the amount of flowing water and the electrolytic current after switching the polarities.

Figure 5:
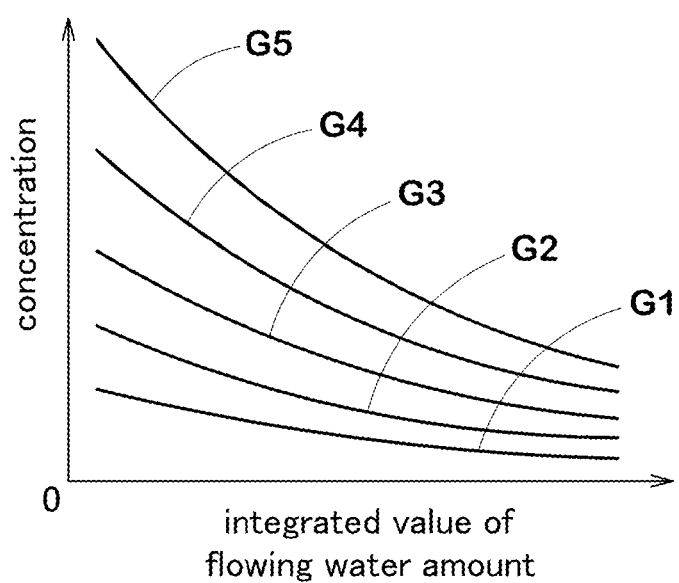
FIG. 5 a graph showing the correlation between the concentration of hydrogen storage metal colloid, and the integrated value of an amount of flowing water and the electrolytic current after switching the polarities.

FIG. 5 shows the correlation between the concentration of the hydrogen storage metal colloid, and the integrated value of the amount of flowing water acquired based on the signal input from the flow rate sensor 22 and the electrolytic current after the polarities were switched.

In FIG. 5, functions G1, G2, G3, G4 and G5 show relationships between the concentration of the hydrogen storage metal colloid, and the integrated value of the amounts of flowing water when the electrolytic currents are 1 [A], 2 [A], 3 [A], 4 [A] and 5 [A], respectively.

Data about the above correlation are, for example, measured in advance through experiments, and stored in the memory (storage unit) of the control unit 5.

It is also possible that the data is stored in an external storage unit of the control unit 5.

The inventors of the present application found out that the concentration of the hydrogen storage metal colloid increases depending on the electrolytic current, and the concentration of the hydrogen storage metal colloid gradually decreases as the integrated value of the amount of flowing water increases at any electrolytic current.

It is considered that this is because the hydrogen storage metal ions in the electrolysis chamber 40 on the cathode side are reduced by the water flow.

When making the calculation in S8, by referencing the functions G1 to G5 prepared according to the specification and the like of the electrolyzed water generating device 1, it becomes possible for the control unit 5 to accurately calculate the concentration of the hydrogen storage metal colloid contained in the electrolyzed water generated in the electrolysis chamber 40 on the cathode side based on the integrated value of the amount of flowing water and the electrolytic current after switching the polarities.

Incidentally, the functions G1, G2, G3, G4 and G5 will be different depending on the specification and the like of the electrolyzed water generating device 1.

In FIG. 5, the function G is shown as a quadratic function as an example, but it may be a linear function or the like.

As shown in FIG. 2, the electrolyzed water generating device 1 of the present embodiment is further provided with a display unit 7 for displaying the concentration calculated by the control unit 5. As the display unit 7, for example, an LCD (Liquid Crystal Display) for displaying images such as character information is adopted. It is also possible that the display unit 7 is constituted by a plurality of LEDs (Light Emitting Diodes) and the like.

Although the electrolyzed water generating device 1 of the present invention has been described in detail above, the present invention is not limited to the above-described specific embodiment, but can be modified to various embodiments.

That is, it is enough for the electrolyzed water generating device 1 to have at least the electrolysis chamber 40 for electrolyzing water to generate electrolyzed water, the first feeding body 41 and the second feeding body 42 which are disposed in the electrolysis chamber 40 and to which a DC voltage is applied, the diaphragm 43 disposed between the first feeding body 41 and the second feeding body 42, and dividing the electrolysis chamber 40 into the first-polar chamber 40a on the first feeding body 41 side and the second-polar chamber 40b on the second feeding body 42 side, the control unit 5 for switching the polarity of the first feeding body 41 to the anode or the cathode, and the polarity of the second feeding body 42 to the cathode or the anode, the flow rate sensor 22 for detecting the amount of flowing water into the electrolysis chamber 40 on the cathode side per unit time, and the current detecting means 44 for detecting the DC current supplied to the first feeding body 41 and the second feeding body 42, wherein the surfaces of the first feeding body 41 and the second feeding body 42 are formed of the hydrogen storage metal, and the control unit 5 calculates the concentration of the hydrogen storage metal colloid in the electrolyzed water generated in the electrolysis chamber 40 on the cathode side based on the DC current and the integrated value of the amount of flowing water after the switching of the polarities.

DESCRIPTION OF THE SIGNS

1: electrolyzed water generating device
5: control unit
7: display unit
22: flow rate sensor
40: electrolysis chamber
40a: first-polar chamber
40b: second-polar chamber
41: first feeding body
42: second feeding body
43: diaphragm
44: current detecting means

The invention claimed is:

1. An electrolyzed water generating device comprising:
an electrolysis chamber for electrolyzing water so as to generate electrolyzed water,
a first feeding body and a second feeding body which are disposed in the electrolysis chamber and to which a DC voltage is applied, wherein a surface of the first feeding body and a surface of the second feeding body are formed of a hydrogen storage metal,
a diaphragm disposed between the first feeding body and the second feeding body to divide the electrolysis chamber into a first-polar chamber on the first feeding body side in which the first feeding body is disposed and a second-polar chamber on the second feeding body side in which the second feeding body is disposed,
a control unit for switching a polarity of the first feeding body and a polarity of the second feeding body into an anode and a cathode, respectively, or a cathode and an anode, respectively,
a flow rate sensor detecting an amount of flowing water into the electrolysis chamber on the cathode side per unit time,
a current detecting means detecting a DC current flowing between the first feeding body and the second feeding body,
a memory in which reference data are stored, wherein, for each value of the DC current flowing between the first feeding body and the second feeding body,
a concentration of a hydrogen storage metal colloid contained in the electrolyzed water generated in the electrolysis chamber on the cathode side is obtained through experiments in advance as a function (G1, G2, G3, G4, G5) of an integrated value of the amount of flowing water into the electrolysis chamber on the cathode side, and
the obtained functions (G1, G2, G3, G4 and G5) are stored as the reference data, wherein each function is such that the concentration decreases as the integrated value increases,
a first water discharge channel for taking out the electrolyzed water generated in one of the first-polar chamber and the second-polar chamber which is on the cathode side,
a second water discharge channel for taking out the electrolyzed water generated in the other of the first-polar chamber and the second-polar chamber which is on the anode side, and
a flow channel switching valve for switching between
a connection state in which the first water discharge channel and the second water discharge channel are respectively connected to the first-polar chamber and the second-polar chamber, and
a connection state in which the first water discharge channel and the second water discharge channel are respectively connected to the second-polar chamber and the first-polar chamber,
wherein
when the electrolyzed water generating device is started and the flowing of water into the electrolyzed water generating device starts,
the control unit applies a DC voltage to the first feeding body and the second feeding body in a first polarity state or a second polarity state to start the electrolysis, wherein
the first polarity state is such that the first feeding body is positively charged and the first-polar chamber functions as an anode chamber, and the second feeding body is negatively charged and the second-polar chamber functions as a cathode chamber, and
the second polarity state is such that the first feeding body is negatively charged and the first-polar chamber functions as a cathode chamber, and the second feeding body is positively charged, and the second-polar chamber functions as an anode chamber,
at a predetermined timing, that is, when the flowing of water into the electrolyzed water generating device is started, or alternatively, when the flowing of water is stopped and the electrolysis is stopped, the control unit switches the polarities of the first and second feeding bodies from the current polarity state to the invert polarity state, the control unit calculates the concentration of the hydrogen storage metal colloid contained in the electrolyzed water generated in the electrolysis chamber on the cathode side based on a value of the DC current flowing between the first feeding body and the second feeding body and an integrated value of the amount of flowing water after switching the polarities of the first feeding body and the second feeding body by the control unit, when calculating the concentration, the control unit refers to the reference data and the functions (G1, G2, G3, G4, G5) stored in the memory based on the DC current value, and the concentration is calculated by using the function (G1, G2, G3, G4, G5) corresponding to the DC current value and the integrated value of the amounts of flowing water.

2. The electrolyzed water generating device as set forth in claim 1, wherein the control unit calculates the concentration further based on the DC current before switching the polarities.

3. The electrolyzed water generating device as set forth in claim 1, which is further provided with a display unit for displaying the concentration calculated by the control unit.

4. The electrolyzed water generating device according to claim 2, which is further provided with a display unit for displaying the concentration calculated by the control unit.

5. An electrolyzed water generating method for generating electrolyzed water by electrolyzing water by using an electrolysis chamber for electrolyzing the water to generate the electrolyzed water, and a first feeding body and a second feeding body whose surfaces are formed of a hydrogen storage metal and which are disposed in the electrolysis chamber, the method comprising:

a step of switching a polarity of the first feeding body and a polarity of the second feeding body to an anode and a cathode respectively or a cathode and an anode respectively, a step of detecting an amount of flowing water into the electrolysis chamber on the cathode side per unit time, a step of detecting a DC current flowing between the first feeding body and the second feeding body, and a calculation step of calculating a concentration of hydrogen storage metal colloid contained in the electrolyzed water generated in the electrolysis chamber on the cathode side based on the DC current and an integrated value of the amount of flowing water after switching the polarities of the first feeding body and the second feeding body, wherein the method further comprises a step of storing reference data, wherein, for each value of the DC current flowing between the first feeding body and the second feeding body, a concentration of a hydrogen storage metal colloid contained in the electrolyzed water generated in the electrolysis chamber on the cathode side is obtained through experiments in advance as a function (G1, G2, G3, G4, G5) of an integrated value of the amount of flowing water into the electrolysis chamber on the cathode side, and the obtained functions (G1, G2, G3, G4 and G5) are stored as the reference data, wherein each function is such that the concentration decreases as the integrated value increases, and in the calculation step, based on the DC current, the reference data and the functions (G1, G2, G3, G4, G5) stored in advance are referred, and the concentration is calculated by using the function (G1, G2, G3, G4, G5) corresponding to the DC current and the integrated value of the amounts of flowing water.

6. The electrolyzed water generating method as set forth in claim 5, wherein in the calculation step, the concentration is calculated further based on the DC current before switching the polarities.

* * * * *